(12) United States Patent
Wang et al.

(10) Patent No.: US 10,574,059 B2
(45) Date of Patent: Feb. 25, 2020

(54) CONTROL APPARATUS AND COMBINER BOX

(71) Applicant: SUNGROW POWER SUPPLY CO., LTD., Hefei Anhui (CN)

(72) Inventors: Xinyu Wang, Hefei Anhui (CN); Jun Xu, Hefei Anhui (CN); Yilei Gu, Hefei Anhui (CN); Yu Gu, Hefei Anhui (CN)

(73) Assignee: SUNGROW POWER SUPPLY CO., LTD., Hefei, Anhui (CN)

( * ) Notice: Subject to any disclaimer, the term of this patent is extended or adjusted under 35 U.S.C. 154(b) by 166 days.

(21) Appl. No.: 15/912,005

(22) Filed: Mar. 5, 2018

(65) Prior Publication Data

US 2018/0342873 A1    Nov. 29, 2018

(30) Foreign Application Priority Data

May 26, 2017 (CN) .......................... 2017 1 0385522

(51) Int. Cl.
*H02J 3/38* (2006.01)
*H02S 40/34* (2014.01)
*G05F 1/67* (2006.01)

(52) U.S. Cl.
CPC ............... *H02J 3/385* (2013.01); *G05F 1/67* (2013.01); *H02S 40/34* (2014.12)

(58) Field of Classification Search
None
See application file for complete search history.

(56) References Cited

U.S. PATENT DOCUMENTS

2012/0187768 A1    7/2012  Goder et al.
2014/0327313 A1    11/2014 Arditi et al.
2016/0036235 A1    2/2016  Getsla
2017/0288409 A1*   10/2017 Yoscovich ............. H02S 40/32
2018/0278204 A1*   9/2018  Alon ....................... H02G 3/16

FOREIGN PATENT DOCUMENTS

| CN | 204349909 U | 5/2015 |
|---|---|---|
| CN | 204696998 U | 10/2015 |
| CN | 105227126 A | 1/2016 |
| CN | 106253330 A | 12/2016 |
| EP | 2778703 A2 | 9/2014 |
| WO | 2009073868 A1 | 6/2009 |

OTHER PUBLICATIONS

Extended European Search Report corresponding to Application No. 18157840.2-1205; dated Sep. 24, 2018.
SIPO First Office Action corresponding to Application No. 201710385522.1; dated Apr. 3, 2019.

* cited by examiner

*Primary Examiner* — Jared Fureman
*Assistant Examiner* — Aqeel H Bukhari
(74) *Attorney, Agent, or Firm* — Cantor Colburn LLP (57) ABSTRACT

A control apparatus and a combiner box are provided. In a case that component maintenance needs to be performed, an optimizer connected to the combiner box is controlled to operate in a safe mode, and a switch-off signal is outputted to disconnect the combiner box from an inverter if an output current of the combiner box is smaller than a threshold. In a case that the maintenance is completed, the optimizer connected to the combiner box is controlled to operate in a maximum power point tracking mode, and the combiner box is connected to the inverter if an input voltage of the combiner box is greater than an output voltage of the combiner box, that is, if an output voltage of a corresponding string increases gradually to a value exceeding a direct current bus voltage.

19 Claims, 5 Drawing Sheets

CONTROL APPARATUS AND COMBINER BOX

CROSS REFERENCE TO RELATED APPLICATION

The present invention claims priority under 35 U.S.C. § 119 to Chinese Patent Application No. 201710385522.1, filed on May 26, 2017, which is incorporated herein by reference in its entirety.

FIELD

The present disclosure relates to the technical field of photovoltaic power generation, and in particular to a control apparatus and a combiner box.

BACKGROUND

Figure 1:
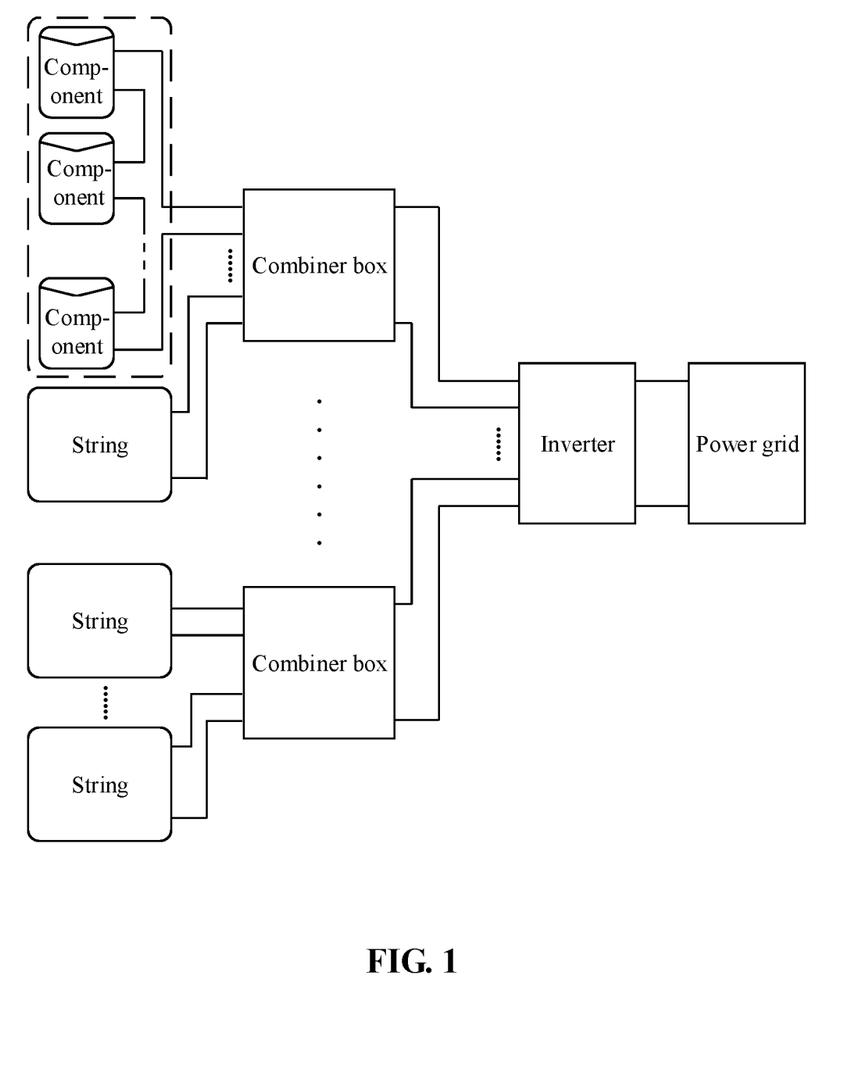
FIG. 1 is a schematic structural diagram of a photovoltaic power generation system according to conventional technologies.

At present, a photovoltaic combiner box is mainly applied to a centralized photovoltaic power generation system, as shown in FIG. 1. Generally, a conventional combiner box includes modules such as an input terminal, an output terminal, a circuit breaker, a fuse box, a lightning protection module, detection circuits for voltage, current and temperature, a control system and a switching power supply. The detection circuits of the combiner box can detect parameters such as a voltage and a current inputted by each string, an output voltage, an output current and a box temperature. The fuse box and the lightning protection module are respectively configured for over current protection and surge protection. The control system can send data of the combiner box to an inverter or a client. The circuit breaker is mainly configured to disconnect the inverter in installation or maintenance, to protect safety of an operator.

In a conventional photovoltaic power generation system with a combiner box, output terminals of multiple combiner boxes are generally connected in parallel to a direct current input terminal of one inverter. In a case that a component connected to a certain combiner box needs to be maintained, the combiner box is disconnected from the inverter by using the circuit breaker, while the inverter and other combiner boxes are still in normal operation states.

Since some components in a string corresponding to the combiner box to be disconnected may still generate electricity, a certain impact current and a certain arc may be inevitably generated due to directly switching off the circuit breaker in the combiner box. In addition, in the case that the maintained component is reconnected to the combiner box, the string corresponding to the combiner box outputs an open-circuit voltage. A direct current bus voltage of the inverter is relatively low since the inverter performs maximum power point tracking (MPPT) control. In this case, it is inevitable to generate a certain impact current which burns down a fuse, in connecting two voltage sources with a large voltage difference in parallel.

SUMMARY

A control apparatus and a combiner box are provided according to the present disclosure, to solve a problem in conventional technologies that an impact current is apt to be generated when disconnection and connection of a combiner box are performed during component maintenance.

In order to achieve the above object, the following technical solutions are provided according to the present disclosure.

A control apparatus is provided. The control apparatus is applied to a photovoltaic power generation system, the photovoltaic power generation system includes an inverter and multiple combiner boxes, an input terminal of each of the combiner boxes is connected to at least one string including an optimizer, output terminals of the multiple of combiner boxes are connected in parallel and connected to a direct current side of the inverter. The control apparatus includes:

a controller configured to transmit, in response to a received maintenance signal, a safe mode switching instruction to the optimizer connected to the combiner box, to control the optimizer to operate in a safe mode; or transmit, in response to a received restart signal, a safe mode exit instruction to the optimizer connected to the combiner box, to control the optimizer to operate in a maximum power point tracking (MPPT) mode; and a parameter detection module configured to detect an input voltage, an output voltage and an output current of the combiner box, and output the detected input voltage, output voltage and output current to the controller, where, in a case that the optimizer operates in the safe mode and the output current is smaller than a threshold, the controller outputs a switch-off signal for disconnecting the combiner box from the inverter; and in a case that the optimizer operates in the MPPT mode and the input voltage is greater than the output voltage, the controller outputs a switch-on signal for connecting the combiner box with the inverter.

Preferably, the parameter detection module includes:

at least two voltage sensors configured to respectively detect the input voltage and the output voltage of the combiner box;

at least two current sensors configured to detect an input current and the output current of the combiner box; and a temperature sensor configured to detect an ambient temperature of the combiner box.

Preferably, the parameter detection module further includes:

an arc detection circuit configured to detect an arc at a port of the combiner box; and an insulation resistance detection circuit configured to detect a resistance of an insulation resistor.

Preferably, the control apparatus further includes:

a discharge circuit configured to discharge to the input terminal of the combiner box in a case that the combiner box is disconnected from the inverter.

Preferably, the control apparatus further includes:

a first communication module configured to perform communication between the combiner box and the optimizer connected to the combiner box; and a second communication module configured to receive a maintenance instruction or a restart connection instruction transmitted by a client, output the maintenance signal to the controller in response to the maintenance instruction, and output the restart signal to the controller in response to the restart connection instruction.

Preferably, the first communication module is configured to:

receive information on an input voltage, an output voltage, an input current and an output current of the optimizer and a component IV curve, and forward the information and the component IV curve to the controller; and receive the safe mode switching instruction and the safe mode exit instruction, and forward the safe mode switching instruction and the safe mode exit instruction to the optimizer.

Preferably, the second communication module is further configured to:

receive power generation amount information, optimizer state information and protection warning information, and forward the received information to the client; and receive a fast switch-off instruction transmitted by the client, and forward the received fast switch-off instruction to the controller.

Preferably, the control apparatus further includes a maintenance switch configured to output the maintenance signal to the controller in a case that the maintenance switch is switched on, and output the restart signal to the controller in a case that the maintenance switch is switched off.

Preferably, the control apparatus further includes:

a switch-off indicator lamp configured to light up once receiving the switch-off signal; and a switch-on indicator lamp configured to light up once receiving the switch-on signal.

A combiner box includes any one of the aforementioned control apparatuses and a circuit breaker. The circuit breaker is configured to disconnect the combiner box from the inverter in a case that the switch-off signal is outputted by the controller, or be switched on to connect the combiner box with the inverter in a case that the switch-on signal is outputted by the controller.

With the control apparatus according to the present disclosure, in the case that component maintenance needs to be performed, the optimizer connected to the combiner box is controlled to operate in the safe mode, and the switch-off signal is outputted to disconnect the combiner box from the inverter in a case that the output current of the combiner box is smaller than the threshold. In this way, the impact current on the optimizer and the arc are reduced. In the case that the maintenance is completed, the optimizer connected to the combiner box is controlled to operate in the MPPT mode. Then, in a case that the input voltage of the combiner box is greater than the output voltage of the combiner box, i.e., in a case that an output voltage of the string corresponding to the combiner box increases gradually to a value exceeding a direct current bus voltage, the combiner box and the inverter are connected, thereby avoiding an impact current caused by an excessive difference between the output voltage and the direct current bus voltage generated in connecting the combiner box to the inverter.

BRIEF DESCRIPTION OF THE DRAWINGS

The drawings to be used in the description of the embodiments of the present disclosure or the conventional technology will be described briefly as follows, so that the technical solutions according to the embodiments of the present disclosure or according to the conventional technology will become clearer. It is apparent that the drawings in the following description only illustrate some embodiments of the present disclosure. For those skilled in the art, other drawings may be obtained according to these drawings without any creative work.

DETAILED DESCRIPTION OF EMBODIMENTS

The technical solutions according to the embodiments of the present disclosure will be described clearly and completely as follows in conjunction with the drawings in the embodiments of the present disclosure. It is apparent that the described embodiments are only a few rather than all of the embodiments according to the present disclosure. Any other embodiments obtained by those skilled in the art based on the embodiments in the present disclosure without any creative efforts fall within the protection scope of the present application.

A control apparatus is provided according to the present disclosure, to solve a problem in conventional technologies that an impact current is apt to be generated when disconnection and connection of a combiner box are performed during component maintenance.

Figure 2:
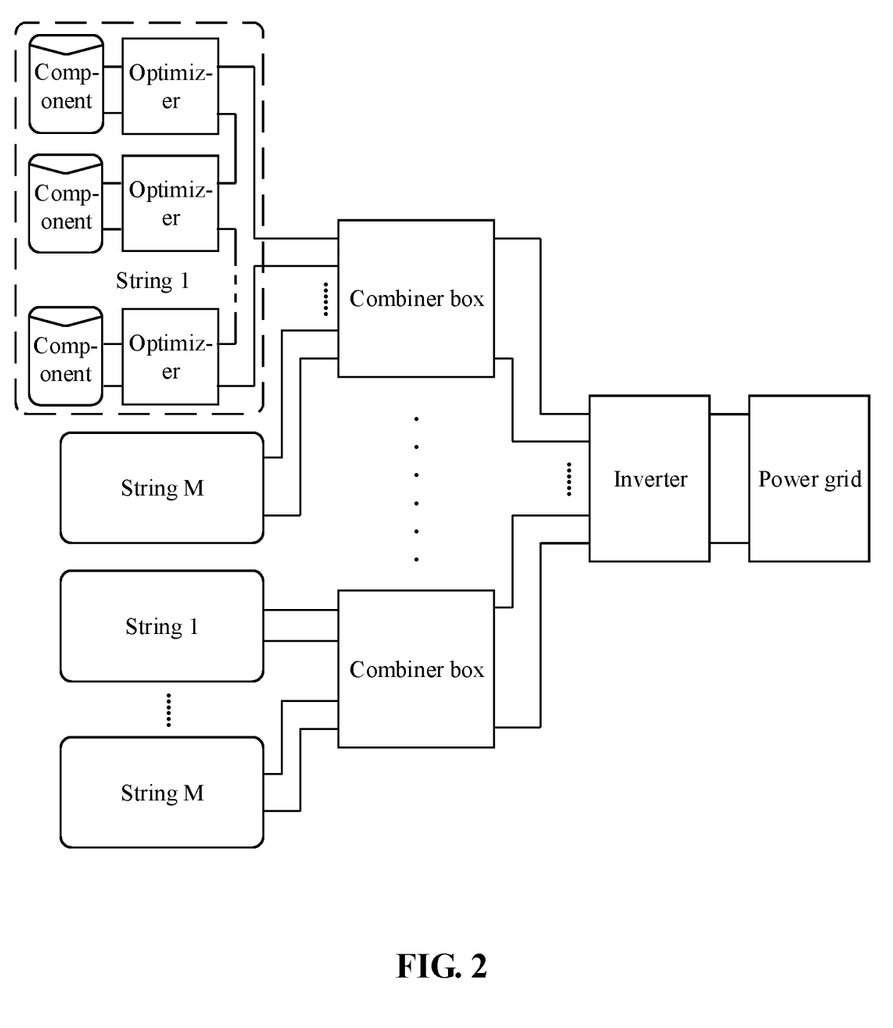
FIG. 2 is a schematic structural diagram of a centralized photovoltaic power generation system according to an embodiment of the present disclosure.
Figure 3:
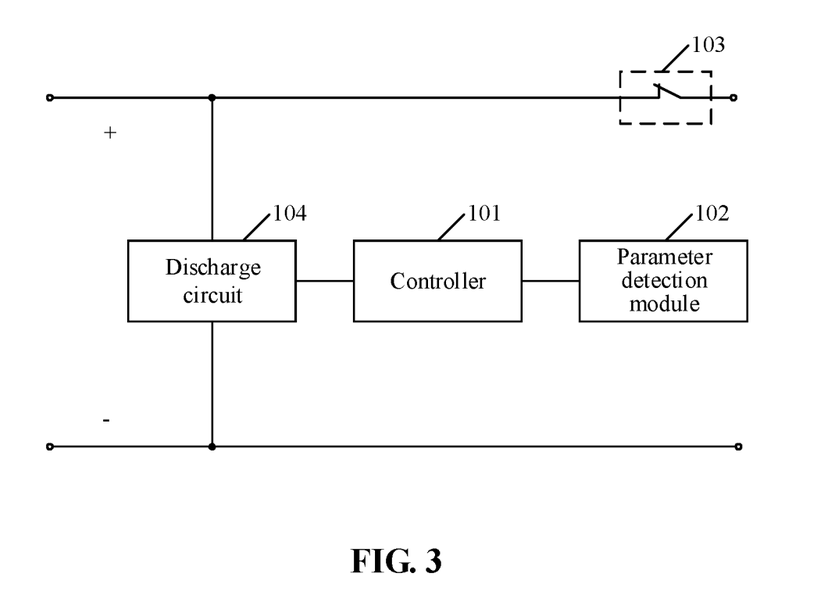
FIG. 3 is a schematic structural diagram of a control apparatus according to an embodiment of the present disclosure.

The control apparatus is applied to a photovoltaic power generation system. As shown in FIG. 2, the photovoltaic power generation system includes an inverter and multiple combiner boxes. An input terminal of each of the combiner boxes is connected to at least one string including an optimizer, and output terminals of all of the combiner boxes are connected in parallel and connected to a direct current side of the inverter. Referring to FIG. 3, the control apparatus includes a controller 101 and a parameter detection module 102.

An output terminal of the parameter detection module 102 is connected to an input terminal of the controller 101.

An operating principle of the control apparatus is described as follows.

In a case that component maintenance needs to be performed, the control apparatus 101 transmits, in response to a received maintenance signal, a safe mode switching instruction to an optimizer connected to a combiner box to control the optimizer to exit from a maximum power point tracking (MPPT) mode and switch into a safe mode. Then, the parameter detection module 102 detects an output current of the combiner box and outputs the detected output current to the controller 101. In this case, the controller 101 outputs a switch-off signal if the output current is smaller than a threshold such as 2A. Then, a circuit breaker 103 in FIG. 3 disconnects the combiner box from the inverter in a case that the switch-off signal is outputted by the controller 101. The combiner box may be disconnected under a safe current based on a configuration of the threshold, thereby ensuring operation safety of a maintainer.

After the component maintenance is completed, the controller 101 transmits, in response to a received restart signal, a safe mode exit instruction to the optimizer connected to the combiner box, to control the optimizer to exit from the safe mode and switch into the MPPT mode. Then, the parameter detection module 102 detects an input voltage and an output voltage of the combiner box and outputs the detected input voltage and output voltage to the controller 101. In this case, the controller 101 outputs a switch-on signal if the input voltage of the combiner box is greater than the output voltage of the combiner box. The circuit breaker 103 is switched on to connect the combiner box with the inverter in a case that the switch-on signal is outputted by the controller 101. In a case that the input voltage of the combiner box is greater than the output voltage of the combiner box, it is indicated that an output voltage of a string corresponding to the combiner box has increased to a direct current bus voltage gradually from zero, and the combiner box may be connected to the direct current side of the inverter in a parallel manner via the circuit breaker 103 once the output voltage of the string just exceeds the direct current bus voltage, thereby avoiding an impact current caused by an excessive voltage difference between two sides of the combiner box in the connection.

In a practical application, the circuit breaker 103 in FIG. 3 may be a circuit breaker in a combiner box or a circuit breaker arranged additionally, which is not limited herein. Circuit breakers all fall within the protection scope of the present disclosure, as long as they can achieve the connection and disconnection between the combiner box and the inverter. In addition, the circuit breaker 103 may be connected to an output terminal of the controller 101 to achieve electrical control. Alternatively, the circuit breaker 103 may be operated manually to achieve manual control, or both of the above two control modes are performed, which is not limited herein. The control modes of the circuit breaker 103 determined based on an application environment all fall within the protection scope of the present disclosure.

It should be noted that, the control apparatus may control the optimizer connected to one combiner box, or simultaneously control optimizers connected to the multiple combiner boxes, which is not limited herein. The optimizers controlled by the control apparatus, which may be determined based on an application environment, all fall within the protection scope of the present disclosure.

It should be noted that, in a case that the centralized photovoltaic power generation system with the structure shown in FIG. 2 is applied, an impact current may be detrimental to both stress and a service life of a device since a small capacitance is outputted by the optimizer (no longer presenting an output characteristic of the string). By using the optimizer, the output voltage can be controlled to be a low voltage (such as 0V), which facilitates a safe operation of the maintainer. However, after the maintenance is completed, a sum of output voltages of the strings is much smaller than the direct current bus voltage of the inverter if all of the optimizers keep outputting low voltages. A traditional combiner box does not have a function of coordinating the output voltage of the optimizer. In this case, a large recharge impact current may be generated when the inverter is reconnected, which is detrimental to the optimizer.

In the control apparatus according to the embodiment, in the case that component maintenance needs to be performed, an optimizer is controlled to operate in the safe mode, and the switch-off signal is outputted to disconnect the combiner box from the inverter in a case that the output current of the combiner box is smaller than the threshold, thereby reducing an impact current on the optimizer and an arc. In addition, after the maintenance is completed, the optimizer is controlled to operate in an MPPT mode, and then the combiner box is connected to the inverter in a case that the input voltage of the combiner box is greater than the output voltage of the combiner box, i.e., the output voltage of the string corresponding to the combiner box increases gradually to a value exceeding the direct current bus voltage, thereby avoiding an impact current caused by an excessive difference between the output voltage and the direct current bus voltage in connecting the combiner box with the inverter.

Preferably, the parameter detection module 102 further includes two voltage sensors and at least two current sensors.

The two voltage sensors are configured to respectively detect the input voltage and the output voltage of the combiner box.

The at least two current sensors are configured to detect an input current and the output current of the combiner box.

Preferably, the parameter detection module 102 further includes a temperature sensor, an arc detection circuit and an insulation resistance detection circuit.

The temperature sensor is configured to detect an ambient temperature of the combiner box.

The arc detection circuit is configured to detect an arc at a port of the combiner box.

The insulation resistance detection circuit is configured to detect a resistance of an insulation resistor.

An input current may be detected by one current sensor, and a sum of all input currents detected by current sensors functions as a total input current. Alternatively, the total input current may be detected by one current sensor, which is not limited herein. The detection approach for obtaining the total input current may be determined based on an application environment, and all determined detection approaches fall within the protection scope of the present disclosure.

The input current and the ambient temperature of the combiner box, the arc at a port of the combiner box and a detected resistance of the insulation resistor may be used for other control by the controller 101, to control or record by cooperating with other modules in the combiner box, which is not described in detail herein.

In addition, in a case that the output current of the combiner box is smaller than the threshold, the combiner box is disconnected from the inverter. In this case, some electrical power remains in the combiner box. Therefore, preferably, the control apparatus further includes a discharge circuit 104, referring to FIG. 3.

The discharge circuit 104 is configured to discharge to the input terminal of the combiner box in a case that the combiner box is disconnected from the inverter.

Figure 4:
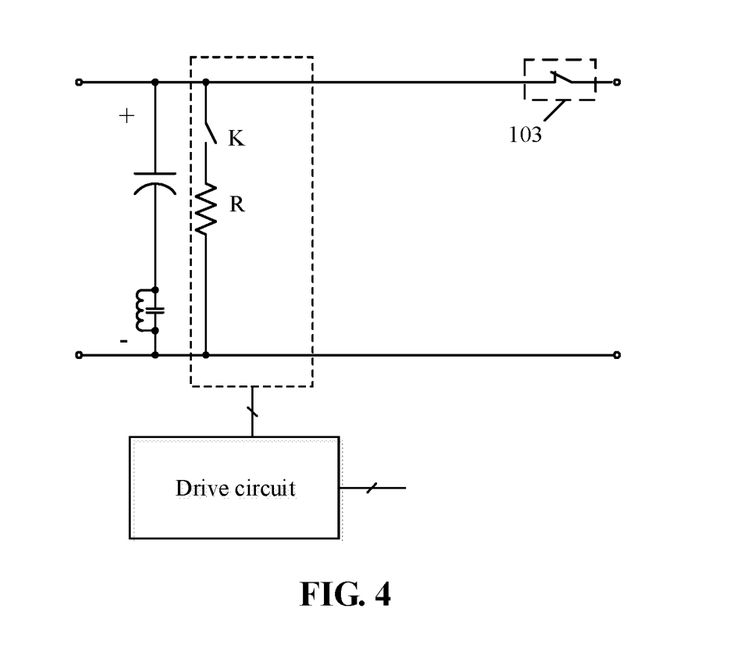
FIG. 4 is a circuit diagram of a discharge circuit according to an embodiment of the present disclosure.

The discharge circuit 104 may be configured based on a practical situation. In an implementation, the discharge circuit includes a resistor R, a switch K and a drive circuit, as shown in FIG. 4.

The resistor R and the switch K are connected in series between a positive electrode and a negative electrode, of the output terminal of the combiner box.

The drive circuit is configured to drive the switch K to be switched on in a case that the circuit breaker is switched off.

An implementation of the discharge circuit 104 may be further determined based on an application environment and is not limited herein. All the solutions, with which discharge can be performed to the input terminal of the combiner box in a case that the circuit breaker is switched off, fall within the protection scope of the present disclosure.

With the discharging function of the discharge circuit 104, the output voltage of the optimizer in a non-operation state is close to zero, thereby ensuring the safety of a maintenance operation.

According to different sources of the signals received by the controller 101, three implementations of the control apparatus are provided according to an embodiment of the present disclosure. In a first implementation, a signal is acquired by receiving an instruction from a client via a communication module. In a second implementation, a signal is acquired with a local hardware switch. In a third implementation, the above two approaches are feasible and either of the two approaches is selected based on an application situation.

Figure 5:
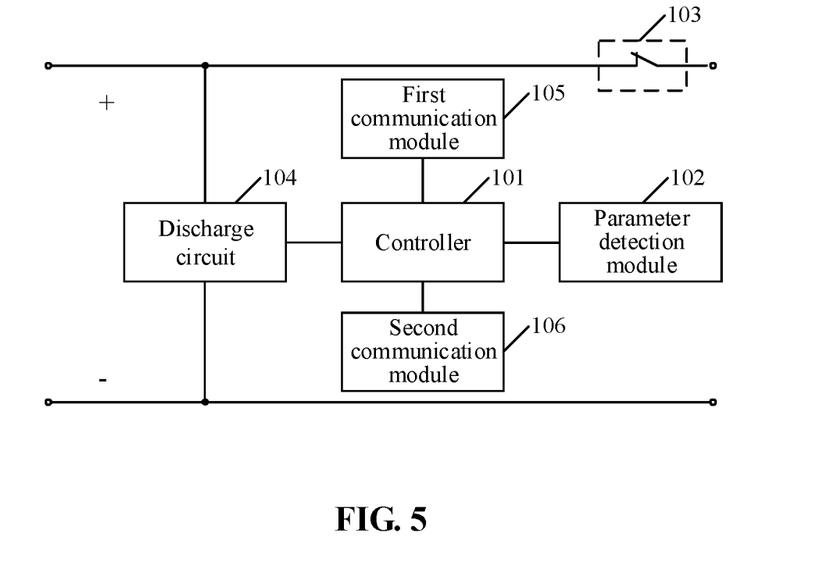
FIG. 5 is a schematic structural diagram of a control apparatus according to an embodiment of the present disclosure.

That is to say, in the first implementation, based on the aforementioned embodiments, the control apparatus further includes a first communication module 105 and a second communication 106, as shown in FIG. 5.

The first communication module 105 is configured to perform communication between a combiner box and an optimizer connected to the combiner box.

The second communication module 106 is configured to receive a maintenance instruction or a restart connection instruction transmitted by a client, output a maintenance signal to the controller in response to the maintenance instruction, and output a restart signal to the controller in response to the restart connection instruction.

Preferably, the first communication module 105 is configured to:

receive information on an input voltage, an output voltage, an input current and an output current of the optimizer and a component IV curve, and forward the information and the component IV curve to the controller; and receive a safe mode switching instruction and a safe mode exit instruction, and forward the safe mode switching instruction and the safe mode exit instruction to the optimizer.

The optimizer may send its state information, such as the input voltage, the output voltage, the input current, the output current, and an IV curve of a photovoltaic panel, to the control apparatus via the first communication module 105. The control apparatus can well evaluate states of the optimizer and the photovoltaic component based on the state information, to provide appropriate data to the controller for an operation such as system maintenance. The first communication module 105 may be implemented by adopting wired communication such as power-line carrier (PLC) communication and industrial field bus communication, and wireless communication such as Wireless Fidelity (WIFI) and ZigBee.

Preferably, the second communication module 106 is further configured to:

receive power generation amount information, optimizer state information and protection warning information, and forward the received information to the client; and receive a fast switch-off instruction transmitted by the client, and forward the received fast switch-off instruction to the controller.

The second communication module 106 transmits information on the system, such as a power generation amount of the system, the state of the optimizer and a protection warning state, to the client. In addition, the second communication module 106 receives an instruction from the client, such as the safe mode switching instruction, the safe mode exit instruction and the fast switch-off instruction, and transmits the received instruction to the controller.

With the second communication module 106, communication with the client can be achieved. In a practical application, an inverter and a cloud need to be arranged between the second communication module 106 and the client, and further, a data collector needs to be arranged between the inverter and the cloud, which depends on a communication mode and is not limited herein.

The second communication module 106 may perform wired communication such as the power-line carrier (PLC) communication and industrial field bus communication, and wireless communication such as WIFI and ZigBee.

Figure 6:
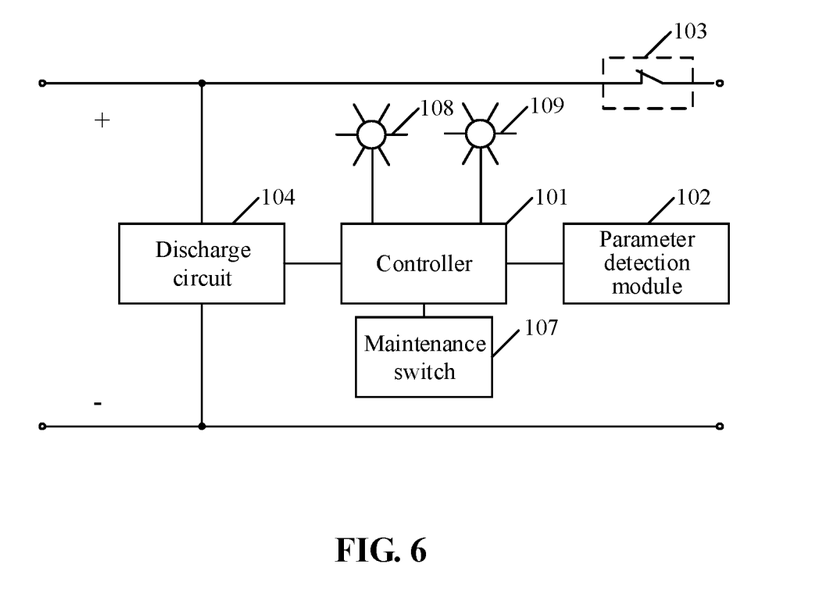
FIG. 6 is a schematic structural diagram of a control apparatus according to another embodiment of the present disclosure.

In the second implementation, based on the above embodiments, the control apparatus further includes a maintenance switch 107, as shown in FIG. 6. A maintenance signal is outputted to the controller 101 in a case that the maintenance switch 107 is switched on, and a restart signal is outputted to the controller 101 in a case that the maintenance switch 107 is switched off.

In the implementation, the maintainer may switch on the locally-arranged maintenance switch 107 by pressing the maintenance switch 107, hence a power signal of the maintenance switch 107 is in a maintenance state, that is, the maintenance signal is outputted to the controller 101. After the maintenance is completed, the maintenance switch 107 is switched off, and the power signal of the maintenance switch 107 is in a maintenance restart state, that is, the restart signal is outputted to the controller 101.

Preferably, referring to FIG. 6, the control apparatus further includes a switch-off indicator lamp 108 and a switch-on indicator lamp 109.

The switch-off indicator lamp 108 is configured to light up once receiving a switch-off signal.

The switch-on indicator lamp 109 is configured to light up once receiving a switch-on signal.

With the switch-off indicator lamp 108 and the switch-on indicator lamp 109, the maintainer can receive a signal instructing to manually operate the circuit breaker, and then manually controls the circuit breaker.

Practically, in a practical application, the circuit breaker may be electrically controlled based on the switch-off signal or the switch-on signal outputted by the controller. The control mode for the circuit breaker is not limited herein and may be determined based on an application environment, and all the determined control modes fall within the protection scope of the present disclosure.

Figure 7:
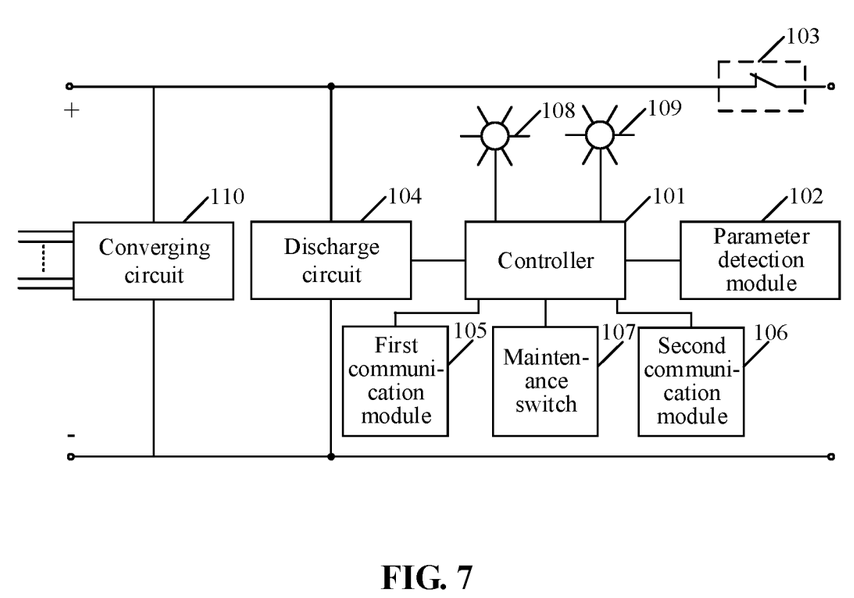
FIG. 7 is a schematic structural diagram of a combiner box according to an embodiment of the present disclosure.

The third implementation of the control apparatus is shown in FIG. 7, in which the above two implementations are combined. Therefore, the structure and operating principle of the control apparatus shown in FIG. 7 are not described in detail herein.

A combiner box is further provided according to an embodiment of the present disclosure. The combiner box includes any one of the control apparatuses according to the aforementioned embodiments and a circuit breaker. The circuit breaker of the combiner box is configured to disconnect the combiner box from the inverter in a case that the switch-off signal is outputted by the controller, or be switched on to connect the combiner box with the inverter in a case that the switch-on signal is outputted by the controller.

A connection relationship and an operating principle of the combiner box are the same as those in the aforementioned embodiments, and are not described in detail herein.

Based on the aforementioned embodiments and FIG. 3 to FIG. 6, preferably, the combiner box further includes a converging circuit 110, as shown in FIG. 7.

The converging circuit 110 is configured to converge the output electrical power of the multiple strings connected to the input terminals of the combiner box, to the inverter in parallel.

The converging circuit 110 performs parallel convergence on the multiple strings connected to the multiple input terminals of the combiner box. For example, in FIG. 2, in a case that the strings 1 to M are connected to the combiner box, the converging circuit 110 performs parallel convergence on the strings 1 to M.

The controller 101 in FIG. 7 operates in response to the instructions, and performs overall control on internal functional modules, such as communication with the optimizer, communication with the client, parameter detection, system maintenance, discharging, system protection and warning.

Preferably, the combiner box further includes an auxiliary power supply.

The auxiliary power supply is configured to provide operating power to the combiner box, and provide stable electrical power to all power consumption units in the system.

In the embodiment, in a case that the string connected to the combiner box needs to be maintained, firstly, a maintenance instruction may be transmitted by the client, or the maintenance switch 107 may be switched on. After receiving the maintenance signal, the controller 101 broadcasts the signal to all the optimizers with the PLC communication technology or other communication technologies, to control the optimizers to exit from the MPPT mode and switch into the safe mode. After receiving the instruction, the optimizer exits from the MPPT mode and switches into the safe mode, and no longer outputs a current. In this case, an output voltage of a single string depends on impedances of the optimizers connected in series and the direct current bus voltage. If it is detected by the combiner box that an output current is smaller than a threshold, a switch-off signal is outputted, the switch-off indicator lamp 108 lights up, and the circuit breaker 103 is switched off (manually or electrically). It is determined whether the circuit breaker is switched off by determining a state of a contact of the circuit breaker. Then, a switch in the discharge circuit is switched on to discharge to the bus voltage, and the switch is switched off 10 seconds later. In this case, the output voltages of all the optimizers are low.

After the string is maintained, the combiner box can be reconnected to the inverter, while the inverter and other combiner boxes operate normally. Firstly, a restart connection instruction is transmitted by the client, or the maintenance switch 107 is switched off. After receiving a restart signal, the controller 101 broadcasts the signal to all of the optimizers based on PLC communication or other communication technologies, to control the optimizers to exit from the safe mode and switch into the MPPT mode. Then, the output voltage of the string increases rapidly. The controller 101 outputs a switch-on signal in a case that it is detected that the input voltage of the combiner box exceeds the output voltage of the combiner box, i.e., the direct current bus voltage of the inverter. For example, in a case that the output voltage of the string is 1230V and the direct current bus voltage of the inverter is 1200V, the controller 101 outputs the switch-on signal to control the switch-on indicator lamp 109 to light up, the circuit breaker 103 is switched on (manually or electrically) and a reconnection is completed.

According to the present disclosure, a multi-functional intelligent combiner box for an optimizer-based photovoltaic power generation system, a coordination control solution for disconnecting the combiner box from an inverter during maintenance, and a coordination control solution for reconnecting the combiner box with the inverter after the maintenance is completed are provided. In addition to functions of a traditional combiner box, the combiner box according to the present disclosure has intelligent features, that is, system maintenance can be intelligently managed and controlled by controlling multiple internal functional modules in a cooperative manner. With the coordination control solution for disconnecting the combiner box from the inverter during the maintenance, the disconnecting can be performed with a current close to zero, thereby reducing damage to the optimizer caused by an impact current. With the coordination control solution for reconnecting the combiner box with the inverter after the maintenance is completed, a small impact current can be generated in the reconnection, thereby reducing damage to the optimizer.

Other operating principles are the same as those described in the aforementioned embodiments, and are not described in detail herein.

The embodiments of the present disclosure are described in a progressive manner. Each embodiment mainly focuses on an aspect different from other embodiments, and reference can be made to these similar parts among the embodiments. The apparatus disclosed in the embodiments corresponds to the method disclosed in the embodiments, and is described relatively simply. For detailed description of the apparatus, reference may be made to the related description of the method.

The foregoing embodiments are only preferred embodiments of the present disclosure, and do not limit the present disclosure in any form. The preferred embodiments according to the disclosure are disclosed above, and are not intended to limit the present disclosure. With the method and technical content disclosed above, those skilled in the art can make some variations and improvements to the technical solutions of the present disclosure, or make some equivalent variations on the embodiments without departing from the scope of technical solutions of the present disclosure. All simple modifications, equivalent variations and improvements made based on the technical essence of the present disclosure without departing the content of the technical solutions of the present disclosure fall within the protection scope of the technical solutions of the present disclosure.

The invention claimed is:

1. A control apparatus, applied to a photovoltaic power generation system, wherein the photovoltaic power generation system comprises an inverter and a plurality of combiner boxes, an input terminal of each of the combiner boxes is connected to at least one string comprising an optimizer, output terminals of the plurality of combiner boxes are connected in parallel and connected to a direct current side of the inverter, and the control apparatus comprises:
   a controller configured to transmit, in response to a received maintenance signal, a safe mode switching instruction to the optimizer connected to the combiner box, to control the optimizer to operate in a safe mode; or transmit, in response to a received restart signal, a safe mode exit instruction to the optimizer connected to the combiner box, to control the optimizer to operate in a maximum power point tracking (MPPT) mode; and
   a parameter detection module configured to detect an input voltage, an output voltage and an output current of the combiner box, and output the detected input voltage, output voltage and output current to the controller, wherein in a case that the optimizer operates in the safe mode and the output current is smaller than a threshold, the controller outputs a switch-off signal for disconnecting the combiner box from the inverter, and wherein in a case that the optimizer operates in the MPPT mode and the input voltage is greater than the output voltage, the controller outputs a switch-on signal for connecting the combiner box with the inverter.

2. The control apparatus according to claim 1, wherein the parameter detection module comprises:
   at least two voltage sensors configured to respectively detect the input voltage and the output voltage of the combiner box; and at least two current sensors configured to detect an input current and the output current of the combiner box.

3. The control apparatus according to claim 2, wherein the parameter detection module further comprises:
a temperature sensor configured to detect an ambient temperature of the combiner box;
an arc detection circuit configured to detect an arc at a port of the combiner box; and
an insulation resistance detection circuit configured to detect a resistance of an insulation resistor.

4. The control apparatus according to claim 3, further comprising:
a first communication module configured to perform communication between the combiner box and the optimizer connected to the combiner box; and
a second communication module configured to receive a maintenance instruction or a restart connection instruction transmitted by a client, output the maintenance signal to the controller in response to the maintenance instruction, and output the restart signal to the controller in response to the restart connection instruction.

5. The control apparatus according to claim 3, further comprising:
a maintenance switch configured to output the maintenance signal to the controller in a case that the maintenance switch is switched on, and output the restart signal to the controller in a case that the maintenance switch is switched off.

6. The control apparatus according to claim 3, further comprising:
a switch-off indicator lamp configured to light up once receiving the switch-off signal; and
a switch-on indicator lamp configured to light up once receiving the switch-on signal.

7. The control apparatus according to claim 2, further comprising:
a first communication module configured to perform communication between the combiner box and the optimizer connected to the combiner box; and
a second communication module configured to receive a maintenance instruction or a restart connection instruction transmitted by a client, output the maintenance signal to the controller in response to the maintenance instruction, and output the restart signal to the controller in response to the restart connection instruction.

8. The control apparatus according to claim 1, further comprising:
a maintenance switch configured to output the maintenance signal to the controller in a case that the maintenance switch is switched on, and output the restart signal to the controller in a case that the maintenance switch is switched off.

9. The control apparatus according to claim 2, further comprising:
a maintenance switch configured to output the maintenance signal to the controller in a case that the maintenance switch is switched on, and output the restart signal to the controller in a case that the maintenance switch is switched off.

10. The control apparatus according to claim 2, further comprising:
a switch-off indicator lamp configured to light up once receiving the switch-off signal; and
a switch-on indicator lamp configured to light up once receiving the switch-on signal.

11. The control apparatus according to claim 1, further comprising:

a discharge circuit configured to discharge to the input terminal of the combiner box in a case that the combiner box is disconnected from the inverter.

12. The control apparatus according to claim 11, further comprising:
a first communication module configured to perform communication between the combiner box and the optimizer connected to the combiner box; and
a second communication module configured to receive a maintenance instruction or a restart connection instruction transmitted by a client, output the maintenance signal to the controller in response to the maintenance instruction, and output the restart signal to the controller in response to the restart connection instruction.

13. The control apparatus according to claim 11, further comprising:
a maintenance switch configured to output the maintenance signal to the controller in a case that the maintenance switch is switched on, and output the restart signal to the controller in a case that the maintenance switch is switched off.

14. The control apparatus according to claim 11, further comprising:
a switch-off indicator lamp configured to light up once receiving the switch-off signal; and
a switch-on indicator lamp configured to light up once receiving the switch-on signal.

15. The control apparatus according to claim 1, further comprising:
a first communication module configured to perform communication between the combiner box and the optimizer connected to the combiner box; and
a second communication module configured to receive a maintenance instruction or a restart connection instruction transmitted by a client, output the maintenance signal to the controller in response to the maintenance instruction, and output the restart signal to the controller in response to the restart connection instruction.

16. The control apparatus according to claim 15, wherein the first communication module is configured to:
receive information on an input voltage, an output voltage, an input current and an output current of the optimizer and a component IV curve, and forward the information and the component IV curve to the controller; and
receive the safe mode switching instruction and the safe mode exit instruction, and forward the safe mode switching instruction and the safe mode exit instruction to the optimizer.

17. The control apparatus according to claim 16, wherein the second communication module is configured to:
receive power generation amount information, optimizer state information and protection warning information, and forward the received information to the client; and
receive a fast switch-off instruction transmitted by the client, and forward the received fast switch-off instruction to the controller.

18. The control apparatus according to claim 1, further comprising:
a switch-off indicator lamp configured to light up once receiving the switch-off signal; and
a switch-on indicator lamp configured to light up once receiving the switch-on signal.

19. A combiner box, comprising the control apparatus according to claim 1 and a circuit breaker, wherein the circuit breaker is configured to disconnect the combiner box from the inverter in a case that the switch-off signal is outputted by the controller, or be switched on to connect the combiner box with the inverter in a case that the switch-on signal is outputted by the controller.

* * * * *